US009691296B2

(12) United States Patent
Hoque et al.

(10) Patent No.: US 9,691,296 B2
(45) Date of Patent: Jun. 27, 2017

(54) METHODS AND APPARATUS FOR CONVERSATION COACH

(71) Applicants: Mohammed Ehasanul Hoque, Pittsford, NY (US); Rosalind Picard, Newton, MA (US)

(72) Inventors: Mohammed Ehasanul Hoque, Pittsford, NY (US); Rosalind Picard, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 315 days.

(21) Appl. No.: 14/294,326

(22) Filed: Jun. 3, 2014

(65) Prior Publication Data
US 2014/0356822 A1    Dec. 4, 2014

Related U.S. Application Data
(60) Provisional application No. 61/830,562, filed on Jun. 3, 2013.

(51) Int. Cl.
| G09B 19/04 | (2006.01) |
| G09B 5/06  | (2006.01) |
| G09B 7/00  | (2006.01) |

(52) U.S. Cl.
CPC ............. *G09B 19/04* (2013.01); *G09B 5/065* (2013.01); *G09B 7/00* (2013.01)

(58) Field of Classification Search
CPC .......... G09B 19/04; G09B 5/065; G09B 7/00; G10L 15/1807; G10L 15/22; A61B 5/164; H04M 3/2281

USPC .......... 434/185, 236; 704/246, 235; 382/118
See application file for complete search history.

(56) References Cited

U.S. PATENT DOCUMENTS

| 8,131,551 B1 * | 3/2012 | Cosatto ............... G10L 15/1807 |
|                |        |                              704/246 |
| 8,532,561 B2   | 9/2013 | Hook et al. |
| 2004/0018477 A1 | 1/2004 | Olsen |
| 2004/0125127 A1 | 7/2004 | Liu |

(Continued)

OTHER PUBLICATIONS

Hoque et al., "Acted vs. natural frustration and delight: Many people smile in natural frustration", IEEE, 2011. 354-359. Web. Oct. 21, 2011.*

(Continued)

*Primary Examiner* — Eddy Saint-Vil
(74) *Attorney, Agent, or Firm* — Stephen R. Otis

(57) ABSTRACT

In exemplary implementations of this invention, a display screen and speakers present an audiovisual display of an animated character to a human user during a conversational period of a coaching session. The virtual character asks questions, listens to the user, and engages in mirroring and backchanneling. A camera and microphone gather audiovisual data regarding behavior of the user. After the conversational period, the display screen and speakers display feedback to the user regarding the user's behavior. For example, the feedback may include a plot of the user's smiles over time, or information regarding prosody of the user's speech. The feedback may also include playing a video of the user that was recorded during the conversational period. The feedback may also include a timeline of the human user's behavior. The virtual coaching may be provided over the Internet.

19 Claims, 6 Drawing Sheets

(56) References Cited

U.S. PATENT DOCUMENTS

| | | | | |
|---|---|---|---|---|
| 2007/0071206 A1* | 3/2007 | Gainsboro | .......... | H04M 3/2281 379/168 |
| 2008/0124690 A1* | 5/2008 | Redlich | .................... | G09B 7/00 434/236 |
| 2011/0212428 A1* | 9/2011 | Baker | ...................... | G09B 5/00 434/308 |
| 2012/0002848 A1* | 1/2012 | Hill | ........................ | A61B 5/164 382/118 |
| 2012/0016671 A1* | 1/2012 | Jaggi | ...................... | G10L 15/22 704/235 |

OTHER PUBLICATIONS

Link et al., "A Test of Responsive Virtual Human Technology as an Interviewer Skills Training Tool", 2002 Annual Conference of the American Association for Public Opinion Research, St. Pete, FL.*

Gratch, J., et al. (2006) Virtual Rapport. Intelligent Virtual Agents, Lecture Notes in Computer Science vol. 4133, 2006, pp. 14-27, Proceedings of 6th International Conference, IVA 2006, Marina Del Rey, CA, USA, Aug. 21-23, 2006.

Huang, L., et al. (2011) Virtual Rapport 2.0. Intelligent Virtual Agents, Lecture Notes in Computer Science vol. 6895, 2011, pp. 68-79, Proceedings of 10th International Conference, IVA 2011, Reykjavik, Iceland, Sep. 15-17, 2011.

Schroder, M., et al. (2012), Building Autonomous Sensitive Artificial Listeners. IEEE Transactions on Affective Computing, vol. 3, issue 2, pp. 165-183.

\* cited by examiner

METHODS AND APPARATUS FOR CONVERSATION COACH

RELATED APPLICATIONS

This application is a non-provisional of, and claims the benefit of the filing date of, U.S. Provisional Application No. 61/830,562, filed Jun. 3, 2013, the entire disclosure of which is herein incorporated by reference.

FIELD OF THE TECHNOLOGY

The present invention relates generally to interactions between humans and computers.

SUMMARY

In exemplary implementations of this invention, a display screen and speakers present an audiovisual display of a virtual character to a human user during a conversational period of a coaching session. The virtual character asks questions, and listens to the user's answers. In addition, the virtual character engages in mirroring activity (e.g., adjusting the character's posture to match that of the user). Also, the virtual character engages in backchanneling activity (e.g., responding to the user's answers by uttering sounds like "Uh-hu" or saying words or phrases such as "Thanks for that answer" or "I understand"). The virtual character is a lifelike animation of a human. The virtual character's behavior is rendered more realistic by subtle features such as eye blinking and saccadic movements of the eye.

During the conversational period, a video camera and microphone gather audiovisual data regarding behavior of a human user.

After the conversational period, the display screen and speakers display feedback to the user regarding the user's behavior. For example, after the conversational period, the display screen and speakers may first display summary feedback and then display detailed feedback.

For example, the summary feedback regarding the user's behavior may include: (a) a plot of the user's smiles over time; (b) information regarding the user's rate of speech, volume of speech, pauses in speech, or pitch variation in speech. The summary feedback may also include a scrolling transcript of words that were recently uttered by the human user. Weak words in the transcript, such as "um" or "like" may be tagged. The scrolling text may be accompanied by a graphical representation of emphasis in the user's voice for each word in the text, with height of a bar indicating volume of the word and width of the bar indicating elongation (time duration) of the word. (Emphasis of a word can be conveyed by either volume or by elongation of the word).

The detailed feedback includes a video of the user taken during the conversational period. For example, if the conversational period was a mock job interview, then the video played later may be a recording of the human user playing the role of an interviewee in the mock job interview. By watching the video, the human user may see and hear himself or herself engaging in behaviors that are not desirable during a job interview, such as saying "um" too often, or not smiling. This helps the human user to realize which behaviors need improvement, and helps motivate the user to actually make the change in behavior.

The detailed feedback may also include a timeline of the human user's behavior. For example, the timeline may include separate tracks showing when the human user smiled, nodded his head, and shook his head. It may also show the user's response time to different questions. The response time may measure, for example: (a) the amount of time that elapsed between when the user started an answer and when the user completed an answer; (b) or the amount of time between when the virtual character completed a question and when the human user started the answer.

In some implementations of this invention, virtual coaching is provided remotely over the Internet. The processors that control the virtual coach may be located on one or more servers (or a computer connected to one or more servers) that are remote from the user. The one or more servers may comprise part of a "cloud" computing service.

In some implementations of this invention, the display screen presents information that compares the user's performance to that of other similar persons. For example, the display screen may show the user's speech rate and a median value of speech rate for users with a similar age, gender and education.

This invention is not limited to job interviews. Instead, this invention may be used for coaching to improve the social-conversational skills of a human user in a wide variety of contexts. For example, depending on the particular implementation, this invention may be used for coaching a human user to improve performance in one or more of the following scenarios: job interviews, dating, requests for dates, public speaking, social phobia, social interaction problems, language learning, customer service, and interactions between medical personnel and patients. Features of this invention (such as the appearance and behavior of the virtual coach, and the type or format of feedback) may be customized for different use scenarios (e.g., mock job interview, or mock date) or for different classes of human users (e.g., elderly women, or teenage boys).

In some implementations, the human user may select a particular persona for a virtual coach, out of a set of personas. For example, the human user may select a virtual coach who appears to be female or a virtual coach who appears to be male.

The description of the present invention in the Summary and Abstract sections hereof is just a summary. It is intended only to give a general introduction to some illustrative implementations of this invention. It does not describe all of the details of this invention. This invention may be implemented in many other ways. Likewise, the description of this invention in the Field of the Technology section is not limiting; instead it identifies, in a general, non-exclusive manner, a field of technology to which exemplary implementations of this invention generally relate.

Figure 1A:
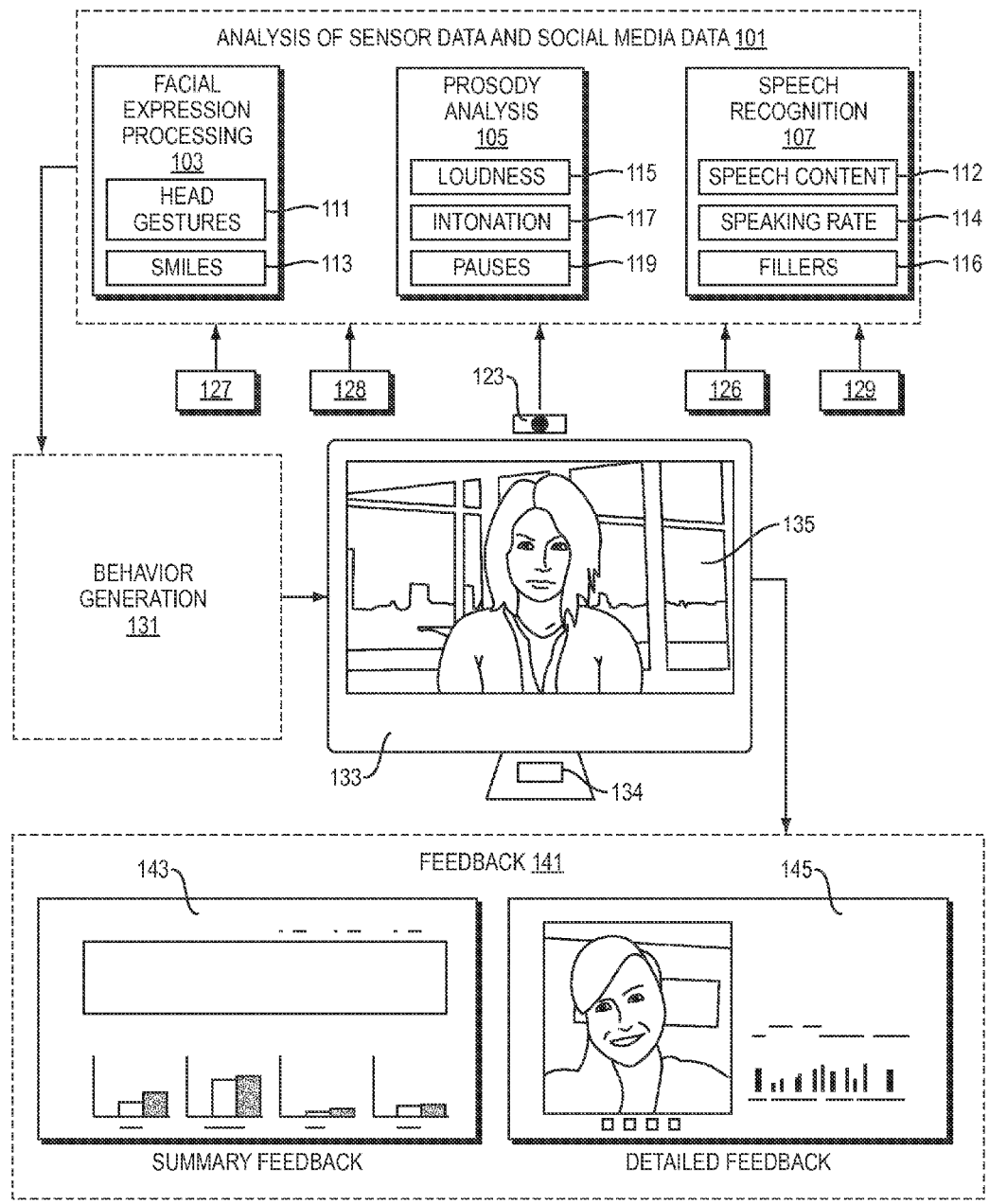
FIG. 1A shows an overview of functionality and hardware of an automated conversation coach.

The above Figures show some illustrative implementations of this invention, or provide information that relates to those implementations. However, this may be implemented in many other ways.

DETAILED DESCRIPTION

In exemplary implementations of this invention, a computerized system provides coaching for a human user. The coaching helps the user improve the user's skills for job interviews, public speaking, dating, patient care, customer service, or other social interactions. In some cases, the system helps a human user learn a foreign language.

In exemplary implementations, a computerized system can capture, analyze and interpret subtle and multimodal human nonverbal behaviors for applications such as automated speech therapy, public speaking, or even helping people with job interviews. Computations for the system can be performed by a personal computer. The system analyzes video data (e.g., facial expressions) and audio data (e.g., speech recognition and prosody analysis) gathered by a webcam and microphone. The system displays a virtual coach. The virtual coach appears to be responsive to a human user, in part because the virtual coach performs backchanneling and mirroring actions. The virtual coach acts aware with real time facial expression processing, speech recognition and prosody analysis, appears life-like in size and resolution, and provides real-time affective feedback. During the coaching session, the virtual coach asks interview questions and automatically mirrors selected behaviors. Following the interaction, the system provides audiovisual feedback on the user's performance.

Illustrative Implementation:

The following is a description of an illustrative implementation of this invention:

During a conversational period of a coaching session, a human user practices conversational and social skills. For example, the conversational period may comprise a mock job interview, or a mock customer service interaction, or a mock date.

During the conversational period, the display screen and speakers present an audiovisual display of a virtual coach. The virtual coach appears to be a human, and appears to both talk and listen to the user, including, at some times, by asking the user questions, by uttering social signal phrases (such as "hello"), or by giving verbal instructions or verbal feedback to the user. At some times in the coaching session, the virtual coach appears to nod its head or to mirror posture or other behavior of a user.

During the conversational period, a webcam and microphone gather audiovisual data in real time during a portion of a coaching session, regarding speech, facial expressions, and gestures (e.g., hand or head movements) of a human user.

After the conversational period, the display screen and speakers display: (a) an audiovisual recording of the user, which was recorded during the conversational period, and (b) a user interface (UI) that provides feedback to the human user regarding the user's behavior during the conversational period. All or part of the UI may be displayed simultaneously with the display of the audiovisual recording of the user.

The UI may, for example, provide visual information (e.g., in the form of charts, plots or diagrams) regarding the user's (i) facial expressions or head gestures (e.g., how often did the user smile or nod); (ii) prosody (e.g., loudness, intonation, pauses), and (iii) speech (e.g., speaking rate and number of weak filler words).

During the conversational period, one or more computer processors analyze sensor data (e.g., audiovisual data) in real time. Based on the sensor data, the processors calculate behavior of a virtual coach, calculate an audiovisual animation of that behavior, and output control signals to cause the display screen and speakers to display the audiovisual animation. The processors also accept input data. The input data is received from transducers (e.g., mouse, keyboard, touch screen, microphone, or UI) and is indicative of input (e.g., information, selections, or instructions) from a human user.

During the conversational period, processors analyze visual data captured by the webcam, in order to track smiles and head gestures (e.g., nods, shakes, tilts) of the human user in every frame.

In order to identify smiles, processors execute a SHORE™ (Sophisticated High-speed Object Recognition Engine) algorithm. The SHORE™ algorithm detects faces and facial features. A classifier is trained using AdaBoost (Adaptive Boosting) with sample images (two classes: smiling and neutral). The features from all over the face are used for boosting. The outcome of the classifier is a normalization function that projects the score to a range [0:100]. Thus, each face image is scored from 0 to 100 representing smile intensity (0 means not smiling, 100 means a full smile).

During the conversational period, processors analyze sensor data to detect user head nods and user head shakes in real time by tracking the "between eyes" region. The processors perform the head shaking algorithm described below (head nod would be identical except that it would process the movement in the y direction). Each frame has a state: 1) stable, 2) extreme and 3) transient. The state is changed based on the following pseudo-code.

```
If max (X_{i+n}) − min (X_{i+n}) ≤ 2 (n = −2... + 2)
    then frame i is in stable state
If X_i = max (X_{i+n}) (n =−2... + 2)
    or X_i = min (X_{i+n}) (n =−2... + 2)
    then frame i is in extreme state
else
    frame i is in transient state
```

Processors frequently check whether the state has changed to stable from non-stable, so that the processors can detect when to trigger a headshake evaluation process. The system has a two-frame delay. If there are more than two extreme states in between the current stable state and the previous stable state, and all the adjacent extreme states differ by two pixels in the X-coordinate, then the processors records the movement as a head shake.

During the conversational period, processors process audio data collected by a microphone to analyze prosody of a human user's speech. The processors automatically recognize pauses, loudness and pitch variation (e.g., how well one is modulating his/her voice). The processors perform an algorithm to recognize pauses. Under the algorithm, a pause is detected using a minimum pitch of 100 (Hz), silence threshold of −25 dB, minimum silent interval duration of 0.5 seconds, and minimum sounding interval duration of 0.5 seconds. The pitch is calculated using acoustic periodicity detection on the basis of an accurate autocorrelation method. For extracting prosodic features of sound, the processors execute API (application programming interface) software that includes low level signal processing algorithms from Praat [praat.org], an open source speech processing toolkit.

Processors analyze audio data collected by a microphone: (1) to recognize text from the sound file; and (2) once the text is extracted, to find the boundary for each word, so that the processors can do word level prosody analysis. To recognize text from the sound track, the processors execute software including a Nuance® speech recognition Software Development Kit (SDK). To recognize the beginning and end of each word, the processors execute a forced alignment algorithm.

Processors analyze audio data collected by a microphone to calculate a speaking rate. For example, the processors may calculate speaking as the total number of syllables per minute during an entire coaching session, and or during a shorter period of time.

During the conversational period, the display screen and microphone display a virtual coach. The coach is a computer-generated animation that behaves and looks approximately like a human. The illusion of behaving like a human is created by, among other things, postural animation, facial expressions, gaze behavior and lip synchronization.

Processors control the apparent posture of the virtual coach. A set of postural animations (including animations of crossing arms, laying arms on the table, balance shift, and hand gestures during speech) are stored in electronic memory. The processors select a postural animation, out of the set of postural animations, to display at a given time.

Processors control the apparent facial behavior of the virtual coach. For example, the processors: (1) achieve lip-sync by using phonemes generated by Cereproc™ software while generating the output voice; and (2) convert phonemes to visemes (shapes of the lips) by using curved interpolation. Furthermore, processors control gaze behavior by: (1) determining a gaze target; and (2) issuing control signals to cause apparent rotations of the eyes and head of the virtual coach, and to cause saccadic movements and blinking of the eyes of the virtual coach. The processors perform algorithms that use Facial Action Units (FAU), controlled by curved-based animations, edited using a dedicated editor. The processors cause the virtual coach's face to display apparent social signals, such as polite smile, head nodding, and frowning. The algorithm has several different animations for each single expression (e.g., different ways of nodding). The processors cause these different animations for a single facial expression to be displayed at different times, thereby creating an illusion of spontaneous behavior.

Processors cause the virtual coach to appear, at times, to mirror behavior by a human user. For example, processors analyze visual data gathered by a webcam, in order to detect head orientation of a human user and smiles by the human user. The processors, at least in some cases, cause the virtual coach to appear to mirror the user's head orientation or smiles. For example, if a human user smiles and nods, the virtual coach may, in some cases, appear to mirror the user's behavior—that is, the virtual coach may appear to smile and nod its head in response.

Processors execute algorithms to determine an appropriate time to display a given behavior animation. For example, during time periods in which the virtual coach is asking questions, this determination may involve reading stored data that specify a list of questions, and when the questions will be asked.

During the conversational period, the virtual coach appears to listen attentively when a human user speaks. In order to provide the illusion of listening, the processors execute software including a listening behavior module ("LBM"). The LBM software triggers and combines variations of head nods, postural expressions and real time mirroring of subtle smiles and head movements. The LBM software modulates (by a randomized deviation) the frequency at which listening behaviors are exhibited. The LBM software selects a random animation for head nods, out of a set of different head nod animations to prevent repetition or predictability. The LBM software provides for the virtual coach to be smoothly interrupted during a given behavior animation.

Processors may cause the virtual coach to display the following behaviors, among others: (1) during most of the time in the coaching session, maintain a neutral expression; (2) when a human user smiles, respond with a polite smile; (3) ask a question, listen carefully to the answer, briefly provide an acknowledgement after the answer, and then move on to the next question, (4) engage in periodic head nods and sometimes crisscross the arms; and (5) after a human user answers a question, make a verbal acknowledgement, such as "That's very interesting," "Thanks for that answer," "Thank you," and "I can understand that."

Software for controlling behavior of the virtual coach may be written using a life-like 3D character platform called Multimodal Affective Reactive Characters (MARC).

After the conversational period, the system provides automated feedback to a human user, regarding the user's behavior. The feedback is regarding the user's behavior during one or more conversational periods (e.g., mock job interviews) of one or more coaching sessions. Processors cause the display screen and speakers to display at least two types of feedback to a human user: summary feedback and detailed feedback.

Figure 2:
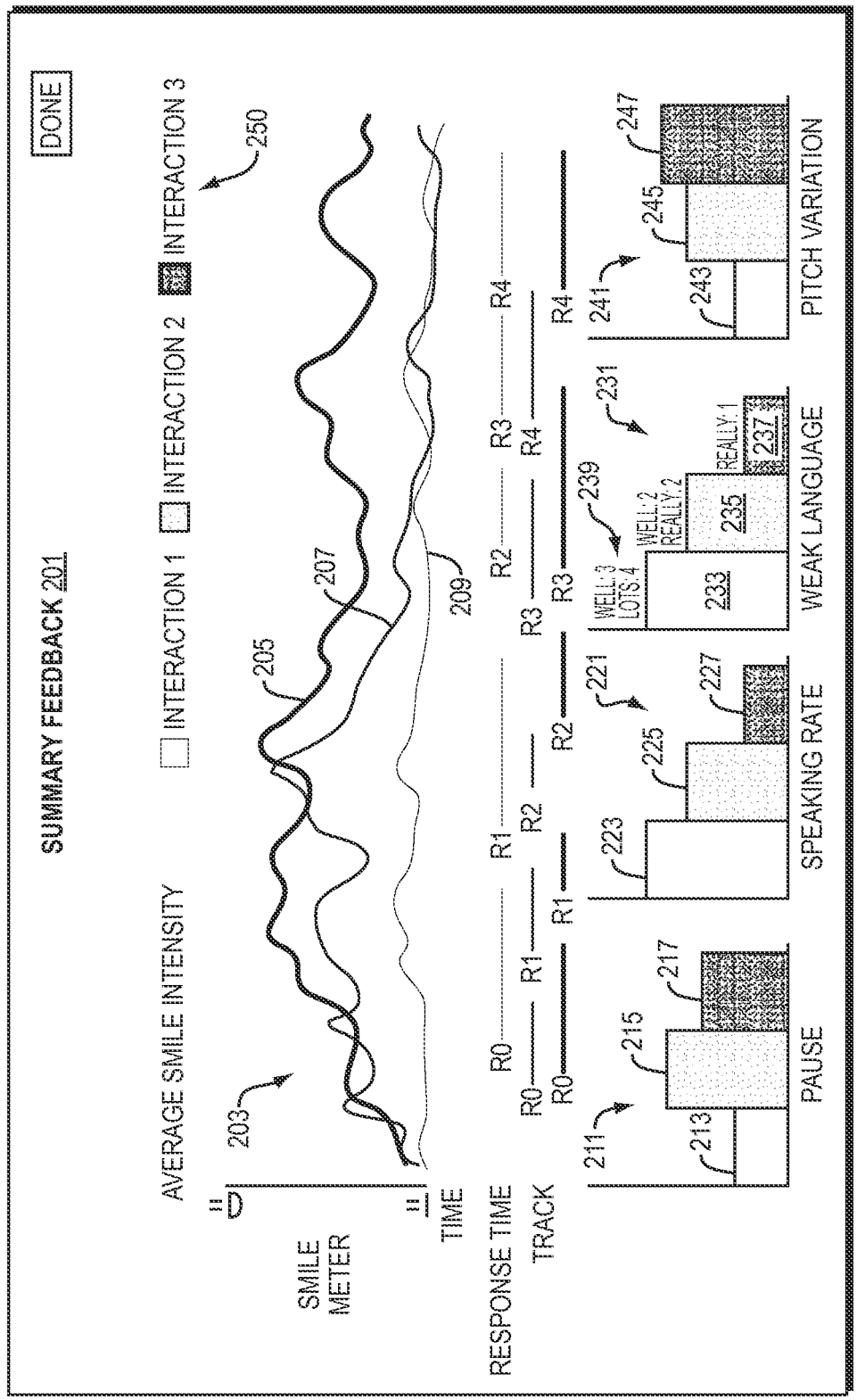
FIG. 2 shows summary feedback provided by a user interface (UI).

An example of summary feedback is shown in FIG. 2.

During the summary feedback, processors cause a UI to display on a display screen. The UI provides a visual summary of user behavior over multiple coaching sessions, thereby allowing a user to track the user's progress across many sessions.

For example, during the summary feedback, part of the UI may display a set of smile tracks, such that each smile track in the set is for a single coaching session, and different colors are used for different sessions. Through this information, a user can see how much, and exactly when, the user smiled during a given session. Another part of the UI displays information about four features of the user's nonverbal behavior during the sessions:

(1) Average pauses during the session: (e.g., if the user spoke for an overall duration of 10 minutes, and within the entire duration, the user paused an overall period of 2 minutes, then the average pause duration would be 20%);

(2) Speaking rate: (total number of spoken syllables per minute during the session), (3) Weak Language: amount of weak language (identify filler words such as "like", "basically", "umm", "totally" etc. as weak language and calculate what percentage of the human user's spoken words contained weak language.

(4) Average pitch movement within speech. For example, average pitch movement may be obtained through Praat [praat.org] analysis.

Figure 3:
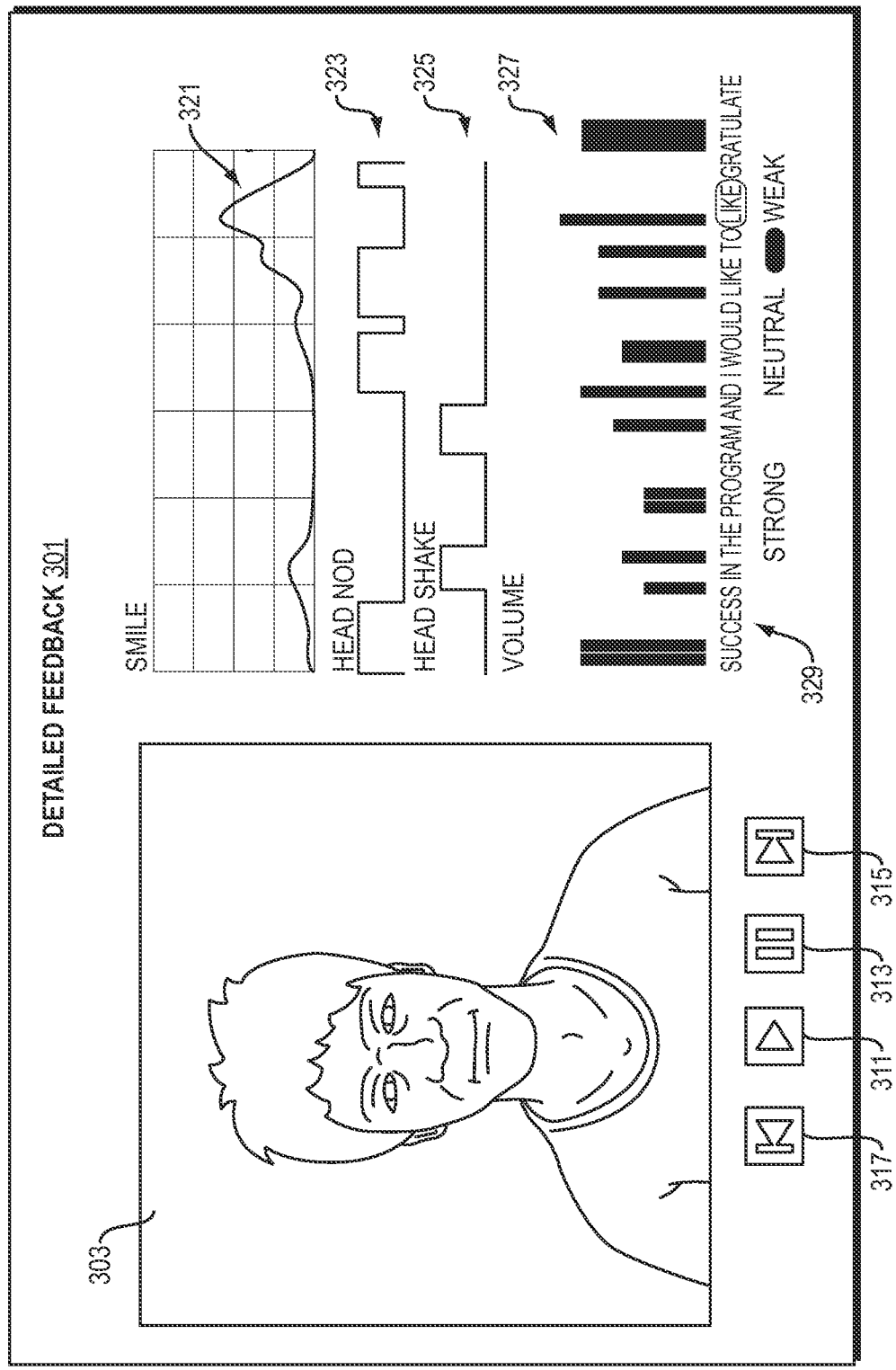
FIG. 3 shows detailed feedback provided by a UI.

After the UI displays the summary feedback, the human user is given an option to view detailed feedback. An example of detailed feedback is shown in FIG. 3.

In the detailed feedback, the UI displays a video (audio-visual) recording of the user that was recording during a coaching session. This allows a user to see and hear how the user spoke and behaved during the coaching session.

In the detailed feedback, the UI plots head nods and head shakes, respectively, as a binary pattern (0 means not present, and 1 means present).

In the detailed feedback, the UI displays a plot of spoken words with weak language marked in red, and strong language marked in blue. The loudness of each word is plotted as a bar, so that for a given utterance, it forms the shape of an audio equalizer display. The space that each word occupies in the UI display corresponds to the time the user took to enunciate it. Thus, the UI provides insights on whether the participant has put more emphasis on certain words, not only by increased volume, but also by elongation.

The time line feedback provides an opportunity for user to view their own interview video along with various nonverbal behaviors as a function of time. The user can observe behaviors across multiple modalities that are out of sync (e.g., putting emphasis on the wrong words, or smiling at odd moments), and make an effort to improve.

This invention is not limited to the hardware, software and functionality of described above in this section titled "Illustrative Implementation". The features described above in this "Illustrative Implementation" section are merely an example, out of many examples, of how this invention may be implemented.

For example: (a) other algorithms, instead of the SHORE™ algorithm, may be used to detect faces, facial features, and facial gestures (such as smiles); (b) other algorithms, instead of Cereproc™ software, may be used to generate phonemes for lip sync; (c) other algorithms, instead of Praat software or Nuance® software, may be used for identifying prosodic features or for speech recognition; and (d) other algorithms, instead of MARC, may be used for controlling behavior of a virtual coach. More generally, this invention may be implemented in many ways (e.g., hardware, software or functionality) that are different than described above.

More Explanation of the Patent Drawings:

FIG. 1A shows an overview of functionality and hardware of an automated conversation coach. In the example shown in FIG. 1A: a microphone 134 and webcam video camera 123 together gather audiovisual sensor data regarding a human user. Other sensors, including physiological sensors (e.g., that measure heartbeat or electrodermal activity) 128 and ubiquitous sensors 127, 129, may collect other sensor data. A computer accepts sensor data from the microphone, webcam and other sensors. In addition, the computer accepts data from social media sources 126.

The computer analyzes the sensor data and social media data 101. This analysis includes facial expression processing 103, prosody analysis 105 and speech recognition 107. The facial expression processing 103 includes head gesture detection 111 and smile detection 113. The prosody analysis 105 includes analysis of the loudness of the user's speech 115, the intonation (e.g. pitch) of the user's speech 117, and pauses in the user's speech 119, and variation in speech features (e.g., variation in one or more of loudness, intonation, or length of pauses). The prosody analysis 105 may include identifying one or more patterns of variation in the user's speech, and comparing these one or more patterns of variation in the user's speech to desirable patterns of variation in speech features. What the prosody analysis 105 treats as desirable patterns of variation in speech features may vary depending on context (e.g., a sales pitch versus a eulogy). The speech recognition processing 107 includes determining content of the user's speech (e.g., determining what words the user spoke) 112, the user's speech rate 114, and what percentage of the user's speech includes "filler" expression such as "um" 116.

Based on the analysis of the sensor data and social media data 101, the computer then determines the behavior of a virtual coach, using a behavior generation software module 131. The computer causes animations of the virtual coach's behavior to be displayed visually on the screen 135 and audibly by speakers. For example, the virtual coach may appear to be a woman, such as the woman shown on screen 135. For example, the display screen 135 may be housed in a computer monitor 133.

The display screen and speakers may comprise a user interface (UI). The computer may cause the UI first to display summary feedback 143 and then to display detailed feedback 145.

Figure 1B:
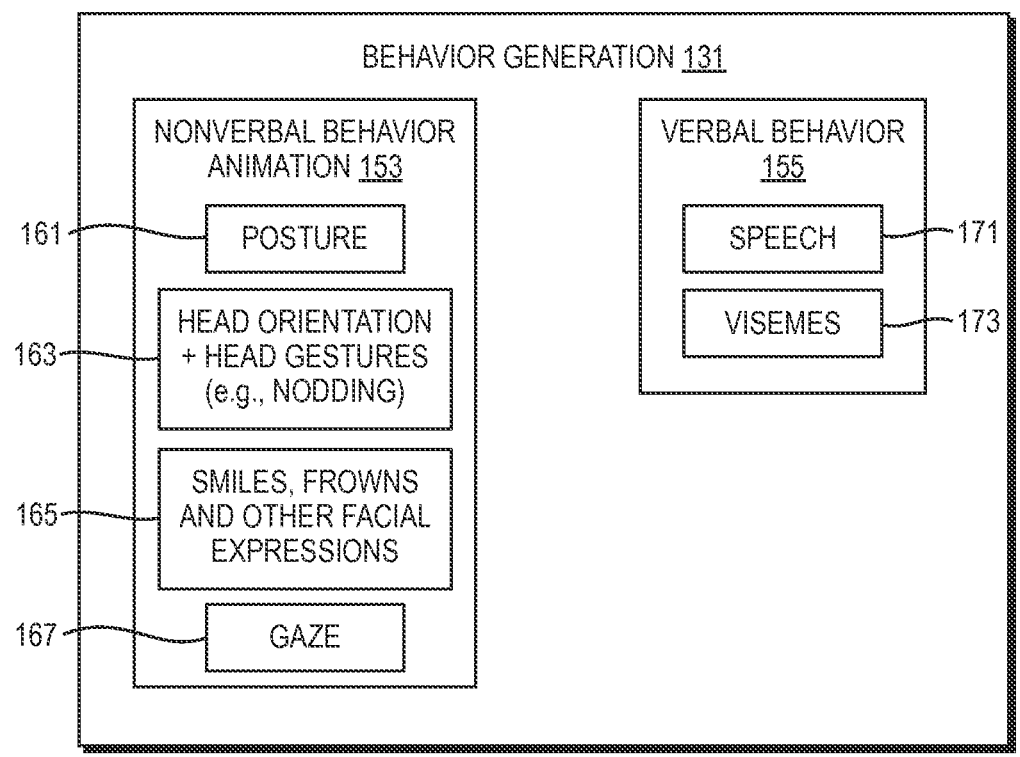
FIG. 1B shows a behavior generation module.

FIG. 1B shows a behavior generation module. In the example shown in FIG. 1B, a behavior generation module 131 includes software for non-verbal behavior animation 153 of a virtual coach. This software controls the virtual coach's apparent posture 161, head orientation and head gestures (e.g., nodding or shaking head from side to side) 163, smiles, frowns and other facial expressions 165, and gaze (including direction of gaze, eye blinking and saccadic movements) 167.

The behavior generation module 131 also includes software for generating verbal behavior 155 of the virtual coach. This software controls the virtual coach's speech 171 and visemes (shape of lips while speaking) 173.

The behavior generation module may include a listening behavior sub-module.

FIG. 2 shows summary feedback 201 provided by a UI. In the example shown in FIG. 2: The summary feedback includes a plot of average smile intensity of the human user over time during one or more coaching sessions. The plot shows smile tracks 203 for three different coaching sessions 205, 207, 209, respectively, and a key 250 that shows different visual indicia (e.g., color or other visual pattern) that identify the smile tracks for the respective coaching sessions. In addition, the summary feedback 201 includes feedback regarding four aspects of the human user's non-verbal behavior: pauses 211, speaking rate 221, weak language 231, and pitch variation 241. For example: (a) the feedback regarding pauses may comprise a bar chart with three bars 213, 215, 217; (b) the feedback regarding speaking rate may comprise a bar chart with three bars 223, 225, 227; (c) the feedback regarding weak language may comprise a bar chart with three bars 233, 235, 237; and (d) the feedback regarding pitch variation may comprise a bar chart with three bars 243, 245, 247. In this example, each of these bar charts has three bars and provides information about three different coaching sessions, one bar per coaching session. The summary feedback also shows how many times specific weak words (such as "well", "lots", and "really") occurred during a given coaching session. In the example shown in FIG. 2, the UI displays information that shows that the user said "well" three times and "lots" four times during the first coaching session. 239

FIG. 3 shows detailed feedback 301 provided by a UI. In the example shown in FIG. 3, the UI displays a video 303 of the user that was recorded during a coaching session. The user can control the playback of the video 303 by selecting (e.g., with a mouse or touchscreen) icons for play 311, pause 313, fast forward 315 and fast rewind 317. The detailed feedback 301 also includes a plot 321 regarding the user's smiles (e.g., average smile intensity) during a coaching session. The detailed feedback also includes a plot 323 of the user's head nods vs. time during the coaching session. The detailed feedback also includes a plot 325 of the user's head shakes vs. time during the coaching session. Head nods and head shakes may be displayed in binary format (e.g., 1 in a vertical direction means nod or shake present, 0 in a vertical direction means not present). The detailed feedback 301 also displays information 327 about particular words spoken by the user. This information includes the text of words being spoken in the video, preferably synchronized with the playback of the video. Above the text of the individual words are bars. The width of the bars indicate how much time the user took to utter the word, and the height of the bars indicate how loudly the user spoke the word. Thus, the user can track two ways in which the user may have emphasized words: volume and elongation of the word. Furthermore, weak words are circled.

Figure 4:
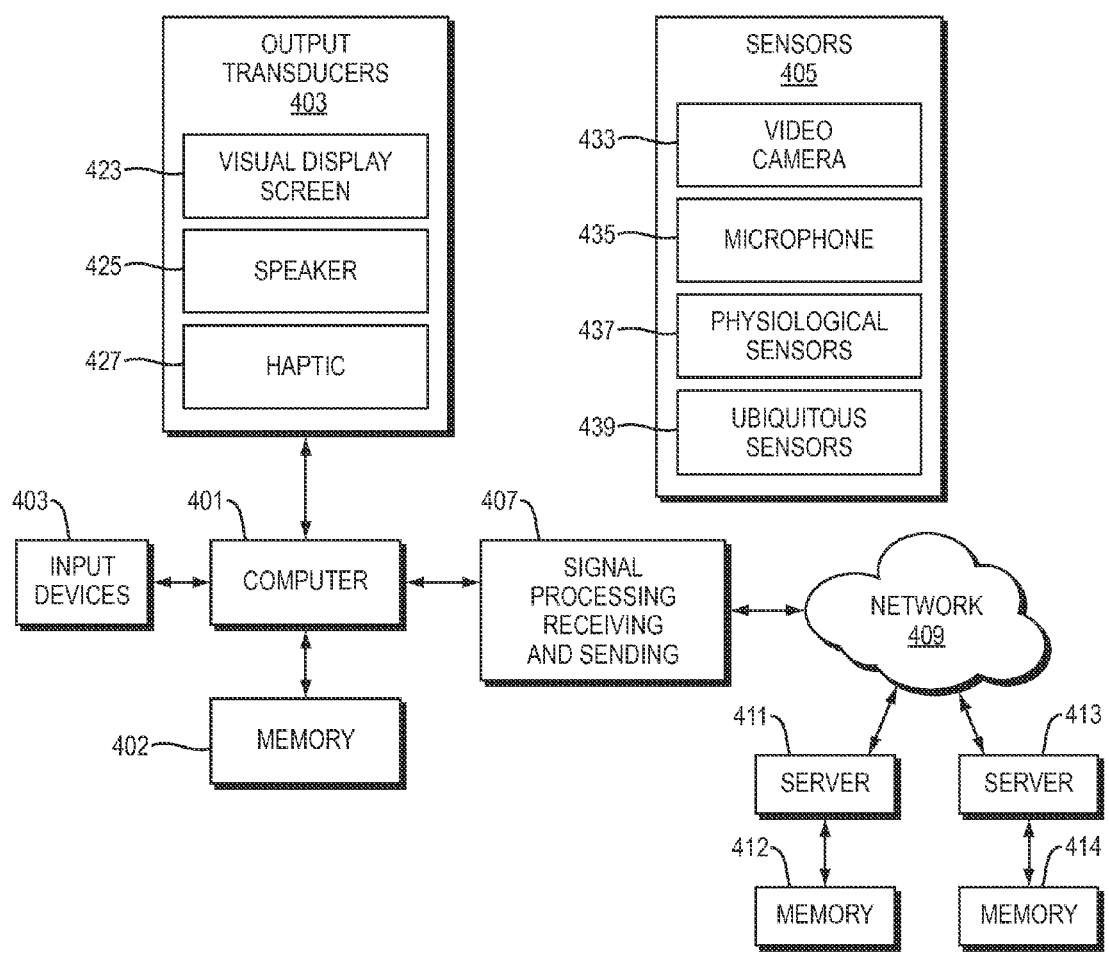
FIG. 4 is a block diagram of hardware used in an automated conversation coach.

FIG. 4 is a block diagram of hardware used in an automated conversation coach. In the example shown in FIG. 4, sensors 405 gather data about a human user during a coaching session. The sensors 405 include a video camera (e.g., webcam) 433, microphone 435, physiological sensors 437, and ubiquitous sensors 439. Output transducers 403 provide humanly perceptible feedback to a human user. The output transducers 403 include a visual display screen 423, speaker 425 and haptic transducer 427. A computer 401 receives sensor data from the sensors 405 and input data from input devices 403. The input devices 403 may include a mouse, keyboard, touch screen, haptic input device or other I/O (input/output) devices. The computer 401 may write data to, or read data from, an electronic memory 402. The computer 401 may be connected to a network (e.g., the Internet) 409 via apparatus for signal processing and for receiving and sending data 407. Through the network 409, the user's computer 401 may interface with servers (e.g., 411, 413) that control the virtual coach and UI. The servers (e.g., 411, 413) may store data in, and retrieve data from, memory devices (e.g., one or more hard drives) 412, 414.

Figure 5:
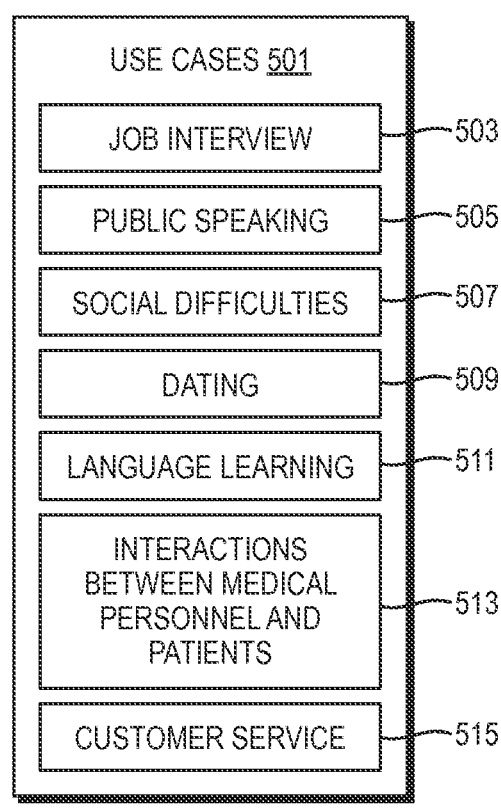
FIG. 5 shows examples of use cases for an automated conversation coach.

FIG. 5 shows examples of use cases 501 for an automated conversation coach. In exemplary implementations of this invention, an automated conversation coach provides training to a human user, to improve the user's skills. For example, an automated conversation coach may be used to help a user improve his skill in one or more of the following scenarios: job interviews 503, public speaking 505, social difficulties (e.g., poor social skills or stressful social situations) 507, dating 509, language learning 511, interactions between medical personnel and patients 513, or customer service 515.

Job Interviews:

In some implementations of this invention, a virtual coach conducts a mock job interview with a human user, in order to help the user improve the user's interview skills.

During the mock job interview, the virtual coach plays the role of an interviewer. The virtual coach verbally asks a series of questions, and appears to listen while the user answers the questions. The virtual coach displays behavior that approximates an intelligent and dominant conversational human partner. The virtual coach nods and smiles, at appropriate times, when the user answers questions. This makes the interaction more credible than it would be if the virtual coach merely stared at the user. The virtual coach appears responsive and aware.

During the mock job interview, the virtual coach appears to maintain a "poker-face" with neutral expression, except for occasional back-channeling and mirroring behaviors (e.g., nodding of head, or smiling in response to a user smile). After the mock job interview, the virtual coach provides expressive feedback.

For example, a user could use the virtual coach for a mock job interview as follows: (In this example, for ease of description, the human user is named Mike and the virtual coach is named John). Mike chooses to interact with an animated coach to improve his interview skills. Mike chooses one of two virtual counselors, John, who appears on the screen, greets him, and starts the interview. When Mike speaks, John periodically nods his head to express acknowledgement, shares smiles, and mirrors his head movements. After the interview, John asks Mike to review the feedback on the side of the screen. Mike sees his own smile track for the entire interaction and notices that he never smiled after the opening. He also gets measurements of his speaking rate, speech intonation, and duration of pauses. Mike chooses to also watch the video of his speaking during the interview, which helps him see where he was not loud enough at the end of some of his answers and where his intonation went flat. He decides to go through another practice interview while the system keeps tracks of his performance across sessions, allowing for objective comparisons.

Additional or Alternative Features:

In some implementations of this invention, virtual coaching is provided remotely over the Internet. The processors that control the virtual coach and UI may be located on one or more servers (or a computer connected to one or more servers) that are remote from the user. A display screen and speakers at the user's location may display the virtual coach and UI. A microphone and webcam at the user's location may record audiovisual data regarding the user. A client computer at the user's location may be operationally interposed between (a) the display screen and speakers at the user's location and (b) an Internet connection to the one or more servers. The one or more servers may comprise part of a "cloud" computing service.

In some implementations of this invention, the UI presents the user with information that compares the user's performance in the coaching session to the performance of similar persons (e.g., persons of the same age, gender, education level, language or ethnicity). Norms and data are also collected allowing understanding of what works best in similar occupations while segmenting them for appropriate contexts (e.g., sales pitches for technical products, sales pitches for amusements). One or more processors collect data for (or access data from) a database regarding parameters of user behavior (e.g., speech rate, speech pauses, speech volume, elongation of words, smiles, head nods, head shaking) In the database, data regarding these parameters is tagged, labeled or otherwise mapped to a variety of different variables regarding the user, such as the user's age, gender, education level, language, ethnicity, nationality, occupation, and relevant context of the speech. In some implementations, the processors calculate statistical measures of the different parameters of user behavior, broken down by these variables. For example, the processors may calculate a statistical measure regarding speech rate, broken down by age, gender, education level, language, and ethnicity. For example, the statistical measure may be a measure of central tendency (e.g., a mean or median), measure of dispersion (e.g., standard deviation), or the measure may be multivariate, describing how the speaking rate varies with other parameters of relevance that might include, e.g., context and the speaking rate of the conversational partner.

Depending on the particular implementation of this invention, the system may be used to help a human user to overcome different types of social-communicative challenges in conversation. For example, in some implementations of this invention, the system helps a user to improve skills or correct problems in at least one of the following scenarios: job interviews, public speaking, social phobia, social difficulties, dating, customer service, professional services, and interactions between medical personnel and patients. For each of these scenarios, one or more features of the system (e.g., the virtual coach or type of feedback) may be customized.

In some implementations of this invention, the processors execute natural language understanding (i.e., machine verbal comprehension) algorithms, in order to analyze audio data to determine the content of the user's speech during a coaching session. In that case, the processors may, in response to detected content of the user's speech, determine the relevance of the detected content, and alter the UI display or the virtual coach's behavior. Alternatively, the processors may cause data regarding the content of the user's speech to be sent to remote computers, so that human workers can rate, or determine a response to, the content of the user's speech.

In some implementations, the virtual coach: (a) appears cartoon-like (rather than humanlike); or (b) in the middle of a mock job interview or other mock social interaction, provides feedback on how well the user is doing (instead of waiting until after the mock interaction to provide that feedback). For example, if the interaction is going well, the virtual coach may continue to look interested. But if the user does something odd, (e.g., monologue, poor eye contact), then the coach may provide subtle cues of being disinterested.

Depending on the particular implementation of this invention, feedback to a human user can be provided in many different ways, including by a virtual coach speaking or by a UI visual display.

In exemplary implementations of this invention, one or more electronic processors are specially adapted: (1) to control the operation of, or interface with, hardware components of an automatic conversation coach, including speakers, display screen, haptic transducer, microphone, video camera, mouse, keyboard or touch screen; (2) to perform calculations to analyze sensor data and social media data, including calculations for facial expression processing, prosody analysis and speech recognition; (3) to compute behaviors of a virtual coach, and to compute audiovisual animations of that behavior; (4) to control an audio-visual display of a user interface; (5) to receive signals indicative of human input, (6) to output signals for controlling transducers for outputting information in human perceivable format, and (7) to process data, perform computations, and control the read/write of data to and from memory devices. The processors may be located in any position or positions within or outside of the automated conversation coach. For example: (a) at least some of the processors may be embedded within or housed together with other components of the automatic conversation coach, such as the display screen, speakers, microphone or webcam; and (b) at least some of the processors may be remote from other components of the automatic conversation coach. The processors may be connected to each other or to other components in the automatic conversation coach either: (a) wirelessly, (b) by wired connection, or (c) by a combination of wired and wireless connections. For example, one or more electronic processors may be housed in a computer (including computer 400 or servers 411, 413 in FIG. 4).

Definitions:

Here are a few definitions and clarifications.

The terms "a" and "an", when modifying a noun, do not imply that only one of the noun exists.

The term "action" shall be construed broadly. For example, "action" includes "inaction" and includes passive listening.

The term "animated character" means a character displayed by animation, which character is a fictional or virtual personality, appears to move, and is not a realistic recording of an actual living person or actual living organism. An animated character may be, but is not necessarily, humanlike in appearance. For example, an animated character may visually appear to be an animated blanket, or to be an animated blanket with cartoon nose and ears, or to be a cartoon rabbit, or to be similar in appearance to a human. Animation that displays an animated character may be created by any technology, including by digital animation or film animation.

The term "behavior" shall be construed broadly. For example, "behavior" includes any action, including speech, interaction with a user interface, or written communication. The adjective "behavorial" shall be construed in like manner.

The term "chart" shall be construed broadly. For example, the term "chart" includes a chart, plot, diagram or graph.

The term "comprise" (and grammatical variations thereof) shall be construed broadly, as if followed by "without limitation". If A comprises B, then A includes B and may include other things.

Unless the context otherwise requires, "date" means a date of the romantic kind For example, if two persons who are romantically interested in each other go to dinner and a movie, they are on a "date".

"Defined Term" means a term that is set forth in quotation marks in this Definitions section.

The term "display" shall be construed broadly, and is not limited to a visual display. For example, a "display" may be visible, audible or haptic, or any combination of the above (e.g., audiovisual).

The term "e.g." means for example.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each can be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes "a third" thing, "a fourth" thing and so on shall be construed in like manner.

The term "for instance" means for example.

The terms "horizontal" and "vertical" shall be construed broadly. For example, "horizontal" and "vertical" may refer to two arbitrarily chosen coordinate axes in a Euclidian two dimensional space, regardless of whether the "vertical" axis is aligned with the orientation of the local gravitational field. For example, a "vertical" axis may oriented along a local surface normal of a physical object, regardless of the orientation of the local gravitational field.

The term "include" (and grammatical variations thereof) shall be construed broadly, as if followed by "without limitation".

The verb "mirror" means to perform an imitation of an aspect of behavior of a person. In order to "mirror", it is not necessary that the imitation be an exact copy of the aspect of behavior that is being imitated, or that the imitation be simultaneous with the aspect of behavior that is being imitated. An animated character may "mirror" an aspect of behavior of an actual human. The verbal noun "mirroring" shall be construed in like manner.

The term "mobile computing device" or "MCD" includes any of the following electronic devices: a smartphone, cell phone, mobile phone, phonepad, tablet, laptop, notebook, notepad, personal digital assistant, enterprise digital assistant, ultra-mobile PC, or any handheld computing device. A device may be an MCD even if it is not configured for direct or indirect connection to an internet or world wide web.

The term "or" is inclusive, not exclusive. For example A or B is true if A is true, or B is true, or both A or B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or can be ignored.

A "plot of x versus y" means a plot in which one axis is x and the other axis is y. For example, the x axis may be a vertical axis and the y axis may be a horizontal axis, or vice versa. For example, in a plot of "smile intensity versus time", the smile intensity axis may be a vertical axis and the time axis may be a horizontal axis, or vice versa.

As used herein, the term "set" does not include a so-called empty set (i.e., a set with no elements).

As used herein, a "subset" of a set consists of less than all of the elements of the set.

"Smile intensity" is a measure of fullness of a smile. For example, "smile intensity" mean be denoted by numerical values corresponding to different points of a range, with one end of the range being a neutral expression or a full frown, and the other end of the range being a full smile.

A "speaker" means an article of manufacture that is a speaker.

The term "such as" means for example.

"UI" means user interface. For example, a UI may be, but is not necessarily, a graphical user interface.

The term "video camera" shall be construed broadly. For example, "video camera" includes any light sensor for capturing a temporal sequence of exposures.

Spatially relative terms such as "under", "below", "above", "over", "upper", "lower", and the like, are used for ease of description to explain the positioning of one element relative to another. The terms are intended to encompass different orientations of an object in addition to different orientations than those depicted in the figures.

Except to the extent that the context clearly requires otherwise, if steps in a method are described herein, then: (1) steps in the method may occur in any order or sequence, even if the order or sequence is different than that described; (2) any step or steps in the method may occur more than once; (3) different steps, out of the steps in the method, may occur different number of times during the method, (4) any step or steps in the method may be done in parallel or serially; (5) any step or steps in the method may be performed iteratively; (5) a given step in the method may be applied to the same thing each time that the particular step occurs or may be applied to different things each time that the given step occurs; and (6) the steps described are not an exhaustive listing of all of the steps in the method, and the method may include other steps.

This Definitions section shall, in all cases, control over and override any other definition of the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. To the extent that any term or phrase is defined or clarified herein, such definition or clarification applies to any grammatical variation of such term or phrase, taking into account the difference in grammatical form. For example, the grammatical variations include noun, verb, participle, adjective, or possessive forms, or different declensions, or different tenses. In each case described in this paragraph, Applicant is acting as Applicant's own lexicographer.

Variations:

This invention may be implemented in many different ways, in addition to those described above.

Here are some non-limiting examples of how this invention may be implemented:

This invention may be implemented as a method comprising, in combination: (a) using a display screen and a speaker to present an audiovisual display of an animated character to a human user during a period of time, while a video camera and microphone gather audiovisual data regarding behavior of a human user during the period; and (b) using the display screen and the speaker, after the period, to display feedback to the user regarding the behavior, which feedback includes (i) visual information in a text, chart or graph format, which visual information includes information regarding smiles of the user and prosody of the user's speech during the period, and (ii) a display of an audiovisual recording of the behavior. Furthermore: The visual information regarding smiles may be a plot of smile intensity versus time. The animated character may appear, at least once during the period, to mirror at least one aspect of the behavior. The animated character may appear during the period to ask a question to the user at a time when the user is not speaking The display of the audiovisual recording of the behavior may be synchronized with the visual information in a text, chart, or graph format. The visual information in text, chart or graph format may include information that compares a behavorial feature of the behavior of the user to a statistical measure of the behavorial feature as exhibited by other humans. The visual information in text, chart or graph format may include information about any one or more of the following: (a) rate of speech; (b) volume of speech; (c) pauses in speech; (d) pitch of speech, or (e) a pattern of variation of one or more features of speech, which one or more features of speech include one or more of rate of speech, volume of speech, pauses in speech, or pitch of speech. The visual information in a text, chart or graph format may include information regarding head nods by the user. The visual information in text, chart or graph format may include information that specifies occurrence, number, percentage or frequency of, or that comprises a text transcription of, sounds or words uttered by the user that are in a specific class of sounds or words, which specific class of sounds or words does not include all of the sounds and words uttered by the user during the period. The animated character may appear to function as an interviewer in a mock job interview during the period. One or processors may determine relevance of content of the user's speech.

This invention may be implemented as a method comprising, in combination: (a) using a speaker to present an audio display, which audio display includes speech, to a human user during a period of time, while a video camera and microphone gather audiovisual data regarding behavior of a human user during the period; and (b) using a display screen and the speaker, after the period, to display feedback to the user regarding the behavior, which feedback includes (i) visual information in a text, chart or graph format, which visual information comprises information regarding smiles of the user and prosody of the user's speech during the period, and (ii) a display of an audiovisual recording of the behavior.

This invention may be implemented as a method comprising, in combination: (a) using a set of one or more servers to accept sensor data, which sensor data has been transmitted through a network and includes audiovisual data gathered by a microphone and a video camera regarding behavior of a first human user during a period of time; (b) using a computer to analyze the sensor data; and (c) using at least one server, out of the set, to output signals for transmission over the network, which signals encode instructions for controlling a display screen and a speaker (i) to display an animated character to the user; which animated character appears, at times during the period, to engage in mirroring, and (ii) to display feedback to the first human user regarding the behavior of the first human user, which feedback includes (A) visual information in a text, chart or graph format, which visual information includes information regarding smiles or prosody of the first human user during the period, and (B) a display of an audiovisual recording of the behavior of the first human user. The one or servers may:(a) output signals to share, with other computers that are nodes in a social network, information regarding the behavior of the first human user; and (b) accept signals that are indicative of feedback from other humans regarding the behavior of the first human user. The animated character may appear, at multiple times during the period, to engage in actions that are responsive to the first human user, including (i) asking questions when the first human user is not speaking, and (ii) nodding or moving the animated character's head, such that the animated character displays all, less than all, or none of the responsive actions at any given time during the period. For each respective user, out of multiple human users, the audiovisual data may capture behavior of the respective user during a period in which an animated character is displayed to the respective user. A computer may calculate a statistical measure regarding an aspect of behavior of a set of users, out of the multiple human users. The set of users may be members of a class, which class is defined, at least in part, by one or more of age, gender, occupation, ethnicity or education level of the members. The visual information in a text, chart or graph format may include information that compares a behavioral feature of the behavior of the first human user to a statistical measure of the behavorial feature as exhibited by other humans. The first human user and each of the other humans may be members of a class, which class is defined, at least in part, by one or more of age, gender, occupation, ethnicity or education level of the members. The behavorial feature may be exhibited by the first human user and each of the other humans in a specific context, out of a set of contexts.

While exemplary implementations are disclosed, many other implementations will occur to one of ordinary skill in the art and are all within the scope of the invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention. Numerous modifications may be made by one of ordinary skill in the art without departing from the scope of the invention.

What is claimed is:

1. A method of interacting with a human user, which interacting is performed by a display screen, a speaker, a video camera and a microphone and which interacting comprises:
   (a) the video camera and the microphone gathering audiovisual data regarding the user during a period of time;
   (b) the display screen and the speaker presenting to the user an audiovisual display of an animated character, such that the animated character
      (i) engages in a verbal conversation with the user during the period, and
      (ii) mirrors, during the conversation (A) posture of the user that occurs during the conversation and (B) other actions of the user that occur during the conversation; and
   c) the display screen and the speaker providing, after the period, visual and audio feedback to the user regarding behavior of the user during the period, which feedback includes
      (i) visual information in a text, chart or graph format, which visual information includes information regarding smiles of the user and prosody of the user's speech during the period, and
      (ii) a display of an audiovisual recording of the behavior.

2. The method of claim 1, wherein the visual information regarding smiles is a plot of smile intensity versus time.

3. The method of claim 1, wherein the animated character appears, at least once during the period, to mirror (i) head orientation of the user or (ii) smiles of the user.

4. The method of claim 1, wherein the animated character appears during the period to ask a question to the user at a time when the user is not speaking.

5. The method of claim 1, wherein:
   (a) during a majority of the period, the animated character maintains a neutral expression;
   (b) when a human user smiles during the period, the animated character responds with a smile;
   (c) at times during the period, the animated character asks a question, appears to listen to an answer given by the user in response to the question, provides a verbal acknowledgement after the answer, and then asks another question; and
   (d) at times during the period, the animated character engages in head nods.

6. The method of claim 1, wherein the visual information in text, chart or graph format includes information that compares a behavioral feature of the behavior of the user to a statistical measure of the behavioral feature as exhibited by other humans.

7. The method of claim 1, wherein the visual information in text, chart or graph format includes information about any one or more of the following: (a) rate of speech; (b) volume of speech; (c) pauses in speech; (d) pitch of speech, or (e) a pattern of variation of one or of speech, which one or more features of speech include one or more of rate of speech, volume of speech, pauses in speech, or pitch of speech.

8. The method of claim 1, wherein the visual information in a text, chart or graph format includes information regarding head nods by the user.

9. The method of claim 1, wherein the visual information in text, chart or graph format includes information that specifies occurrence, number, percentage or frequency of, or that comprises a text transcription of, sounds or words uttered by the user that are in a specific class of sounds or words, which specific class of sounds or words does not include all of the sounds and words uttered by the user during the period.

10. The method of claim 1, wherein the animated character appears to function as an interviewer in a mock job interview during the period.

11. The method of claim 1, wherein one or processors determine relevance of content of the user's speech.

12. A method comprising, in combination:
   (a) a set of one or more servers accepting sensor data, which sensor data has been transmitted through a network and includes audiovisual data gathered by a microphone and a video camera regarding a first human user during a period of time;
   (b) a computer analyzing the sensor data; and
   (c) at least one server, out of the set, outputting signals for transmission over the network, which signals encode instructions for controlling a display screen and a speaker to interact with the user
      (i) by displaying an animated character to the user, such that the animated character
         (A) engages in a verbal conversation with the user during the period, and
         (B) mirrors, during the conversation (1) posture of the user that occurs during the conversation and (2) other actions of the user that occur during the conversation, and
      (ii) by displaying feedback to the first human user regarding behavior of the first human user that occurs during the period, which feedback includes
         (A) visual information in a text, chart or graph format, which visual information includes information regarding smiles or prosody of the first human user during the period, and
         (B) a display of an audiovisual recording of the behavior.

13. The method of claim 12, wherein the one or more servers: (a) output signals to share, with other computers that are nodes in a social network, information regarding the behavior of the first human user; and (b) accept signals that are indicative of feedback from other humans regarding the behavior of the first human user.

14. The method of claim 12, wherein the animated character appears, at multiple times during the period, to engage in actions that are responsive to the first human user, including (i) asking questions when the first human user is not speaking, and (ii) nodding or moving the animated character's head, such that the animated character displays all, less than all, or none of the responsive actions at any given time during the period.

15. The method of claim 12, wherein:
   (a) for each respective user, out of multiple human users, the audiovisual data captures behavior of the respective user during a period in which an animated character is displayed to the respective user;
   (b) the method further comprises using a computer to calculate a statistical measure regarding an aspect of behavior of a set of users, out of the multiple human users.

16. The method of claim 15, wherein the animated character interacts with the user by:
   (a) during a majority of the period, maintaining a neutral expression;
   (b) when a human user smiles during the period, responding with a smile;
   (c) at times during the period, asking a question, appearing to listen to an answer given by the user in response to the question, providing a verbal acknowledgement after the answer, and then asking another question; and
   (d) at times during the period, engaging in head nods.

17. The method of claim 12, wherein the visual information in a text, chart or graph format includes information that compares a behavioral feature of the behavior of the first human user to a statistical measure of the behavioral feature as exhibited by other humans.

18. The method of claim 17, wherein the first human user and each of the other humans are members of a class, which class is defined, at least in part, by one or more of age, gender, occupation, ethnicity or education level of the members.

19. The method of claim 18, wherein the animated character appears, at times during the period, to interact with the user by mirroring (i) head orientation of the user or (ii) smiles of the user.

* * * * *